Patented Aug. 23, 1932

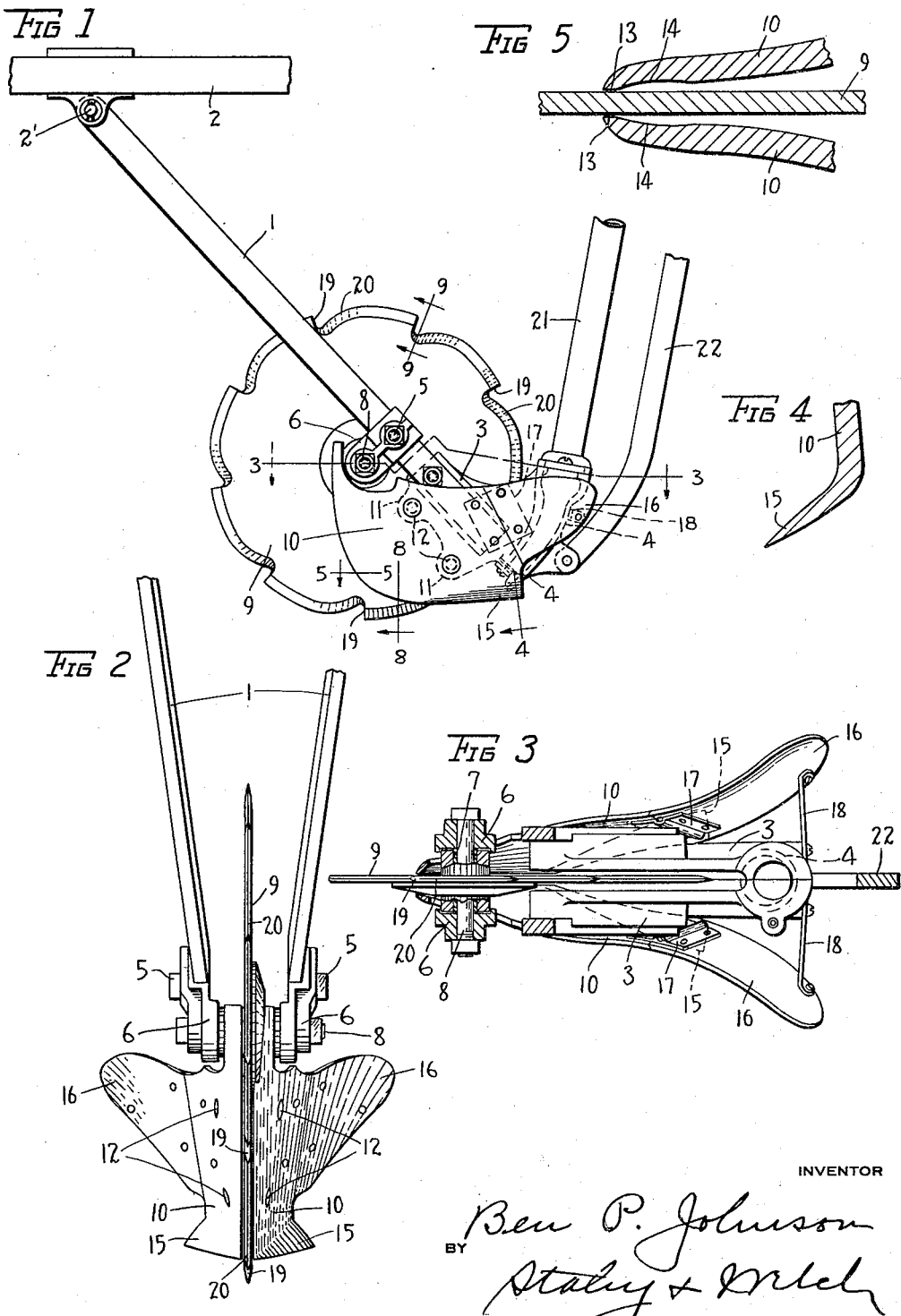

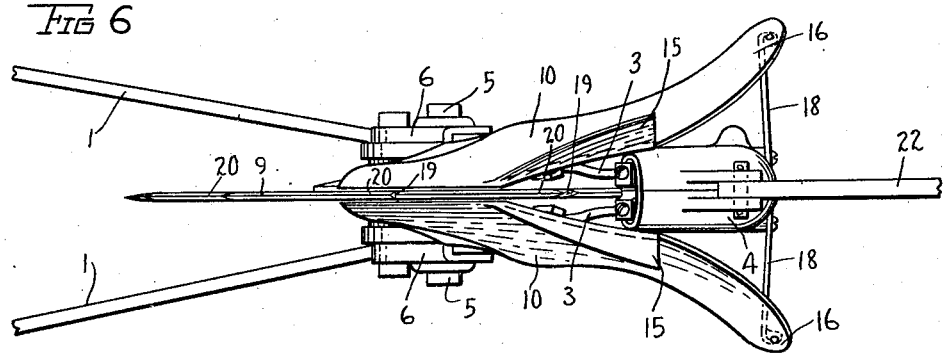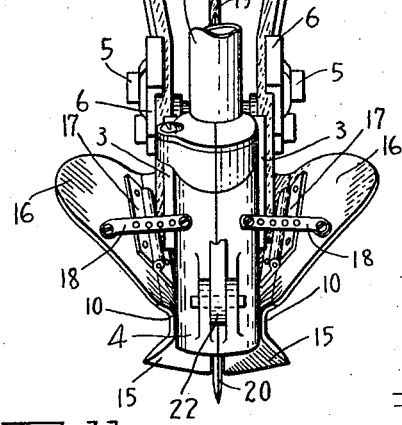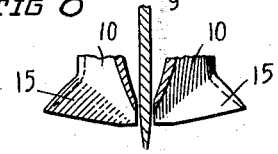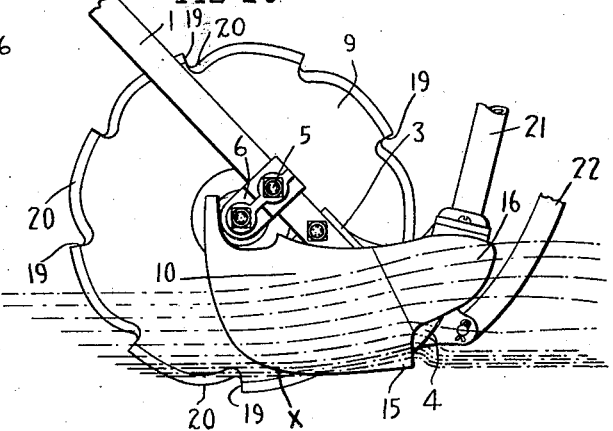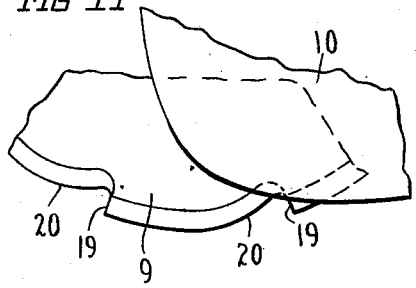

1,873,128

UNITED STATES PATENT OFFICE

BEN P. JOHNSON, OF SPRINGFIELD, OHIO, ASSIGNOR TO E. E. GREINER, OF SPRINGFIELD, OHIO

FURROW OPENER

Application filed February 17, 1930. Serial No. 428,892.

This invention relates to improvements in furrow openers for seeding machines, it more particularly relating to a furrow opener of the type which employs a flat coulter disk and a pair of mold boards.

One of the objects of the invention is to provide improved means for producing a wide, deep, flat-bottom seed trench of sufficient depth to upturn the under stream of moist earth, depositing the seed over the bottom of the furrow in such manner as to prevent bunching of the plants and covering the seed with a proper thickness of the moist earth taken from the bottom of the furrow.

Another object of the invention is to provide adjustable means in connection with the mold boards for regulating the height and shape of the ridges made by the furrow opener so as to secure a high peaked ridge or a low flat-top ridge depending on the character of the ground and speed of the machine.

A further object of the invention is the provision of means for preventing clogging of the furrow by weeds, stalks and other trash; a more specific object of the invention in this connection being to so construct the periphery of the revolving coulter as to cause it to co-act with the forward edges of the mold boards to effect a shearing action to sever the weeds, roots, stalks, or other trash which may be gathered during the progress of the travel of the furrow opener and tend to clog the same by wedging between the disk and mold boards.

Further objects of the invention will appear from the accompanying description.

In the accompanying drawings:

Fig. 1 is a side elevation of a furrow opener embodying the improvements.

Fig. 2 is a front elevation on a slightly enlarged scale.

Fig. 3 is a horizontal section on the line 3—3 of Fig. 1 on the same scale as Fig. 2.

Fig. 4 is a section of a portion of one of the mold boards, the section being on the line 4—4 of Fig. 1.

Fig. 5 is a section of portions of the coulter and two mold boards, the section being on the line 5—5 of Fig. 1.

Fig. 6 is a bottom plan of the furrow opener.

Fig. 7 is a rear elevation of the same.

Fig. 8 is a section of portions of the coulter and mold boards, the section being on the line 8—8 of Fig. 1.

Fig. 9 is a section of a portion of the coulter, the section being on the line 9—9 of Fig. 1.

Fig. 10 is a side elevation showing diagrammatically the manner in which the earth of the furrow is moved.

Fig. 11 is an enlarged side elevation of a portion of the periphery of the coulter disk and one of the mold boards.

Referring to the drawings, the device is equipped with the usual drag-bars 1 which are pivotally attached to the usual draft-bar 2′ secured to the frame 2 of the seeding machine. Attached to the rear ends of the drag-bars is a pair of castings 3 which fit together to form the usual seed boot 4 and which also act to support the mold boards to be described. Also secured to each drag-bar forward of the castings 3 by a bolt 5 is a hanger 6, these hangers having clamped therebetween a sleeve 7 by a bolt 8. Upon the sleeve 7 is journalled the hub of a coulter 9 which is in the form of a flat disk.

Secured to the castings 3 is a pair of mold boards 10 which lie on opposite sides of the coulter 9; each casting being provided with a pair of ears 11 to which the mold boards are directly secured by bolts 12. The forward edge of each of these mold boards is shaped to closely hug the coulter, the forward edges being inturned and preferably provided with flat faces 13 as shown in Fig. 5 and the inner face of each mold board immediately back of the flat face 13 being dished as indicated at 14 to provide clearance to obviate friction. These mold boards diverge outwardly and rearwardly as shown and act to turn the earth on each side of the cut made by the disk to provide a deep furrow which has a wide flat bottom, the earth turned by the mold boards proper forming ridges at the side of the trench.

To provide for covering the seed which is deposited in the trench by moist earth taken from the bottom of the furrow or trench I equip each of the mold boards with an outturned lip along its lower edge as indicated at 15. As shown, each of these lips begin at a point where the corresponding mold board begins to diverge from the coulter and is gradually widened toward its rear end, the lip being formed on an upward incline rearwardly and a downward incline in an outward lateral direction, so that its cutting edge will gradually diverge from the mold board rearwardly on an upward incline as shown best in Figs. 2 and 4. These lips 15 act to scoop out or unearth the moist ground along the lower walls of the trench made by the mold boards proper, this moist earth riding over the lips and falling from the rear edges thereof onto the seed which has been deposited into the furrow; the main body of the earth which has been upturned by the mold boards proper being deposited at the sides of the trench so as to form ridges.

The ridges thus formed act as wind breakers or deflectors to protect the seed. When sowing in fine light soil subject to slight shifting due to winds a low flat top ridge is desired, while when sowing in stubble ground a high ridge is desirable for retaining the stubble as well as the clods in the top of the same. In order to provide for either a low or high ridge, I have provided for each of the mold boards an adjustable wing 16 which is secured by a hinge 17 to the upper rear portion of the mold board and is arranged to be held outwardly in the working position shown by a brace 18, one end of which is pivotally secured to the wing and the other adapted to be secured to the boot by a screw or other suitable fastening device which will enable the brace to be detached from the boot so as to permit the wings to fold inwardly. When the wings are in their outward position the tendency is to make a high ridge at each side of the trench while when the wings are released and folded inwardly lower ridges are produced.

For the purpose of affording traction and also to prevent clogging by weeds, stalks and the like I have formed the periphery of the coulter disk of a peculiar construction. To that end the periphery of the disk is provided with a series of serrations, one wall 19 extending radially and the other wall 20 being at an angle to the radial wall. The radial wall 19, which will be called the advancing edge of the serration considering the direction of rotation of the disk, acts, as the disk is drawn forward to give it a tractive effect to maintain the rotation of the disk, while the other edge 20 which will be called the trailing edge of the serration co-acts with the edges of the mold boards to shear or cut any weeds, stalks or other trash which may tend to find lodgment. It should be explained that as the disk rides over a weed or stalk it has a tendency to bend the weed or stalk into a V-form without cutting it, the weed or stalk folding back over the mold boards at about the point indicated at X in Fig. 10. As the trailing edge of each serration however passes the mold boards adjacent this point there is a shearing action which results in completely severing the weed or stalk and thus preventing clogging by an accumulation of such weeds or stalks.

The usual seed tube 21 leads to the boot and also connected to the boot is the usual lifting and pressure-applying rod 22 which supports the usual coil pressure spring (not shown in the present case) by which yieldable pressure is applied to the furrow opener when in operation.

Having thus described my invention, I claim:

1. In a furrow opener, a flat coulter disk, and a pair of mold boards cooperating therewith to form a furrow, the forward edges of said mold boards lying in close proximity to said disk, said disk having a series of serrations on the periphery thereof, the trailing edge of each serration being so formed as to cooperate with the edges of said mold boards with a shearing action.

2. In a furrow opener, a flat coulter disk, and a pair of mold boards cooperating therewith to form a furrow, the forward edges of said mold boards lying in close proximity to said disk, said disk having a series of serrations from the periphery thereof, the trailing edge of each serration being so formed as to cooperate with the edges of said mold boards with a shearing action, the advancing edge of each serration being formed to provide traction for the disk.

3. In a furrow opener, a flat coulter disk, and a pair of mold boards cooperating therewith to form a furrow, the forward edges of said mold boards lying in close proximity to said disk, said disk having a series of serrations in the periphery thereof, the advancing edge of each serration being formed on a radial line, the trailing edge of each serration being formed at an angle to the advancing edge, a portion of the forward part of each mold board overlapping the serrated edge of said disk to cooperate with the trailing edges of said serrations to sever trash.

4. In a furrow opener, a flat coulter disk, and a pair of mold boards cooperating therewith to form a furrow, the forward edges of said mold boards lying in close proximity to said disk, said disk having a series of serrations in a periphery thereof, each serration having a cutting edge beginning with the periphery of the disk and inclining inwardly of the disk in the direction of rotation thereof to cooperate with the mold boards to cut trash.

In testimony whereof, I have hereunto set my hand this 10th day of February 1930.

BEN P. JOHNSON.